Dec. 24, 1957  M. A. DICKEN ET AL  2,817,319
WINDSHIELD WIPER MOTOR
Filed June 27, 1955  2 Sheets-Sheet 1

INVENTORS
MAXWELL A. DICKEN &
PAUL T. KEIM
BY Craig V. Morton
THEIR ATTORNEY

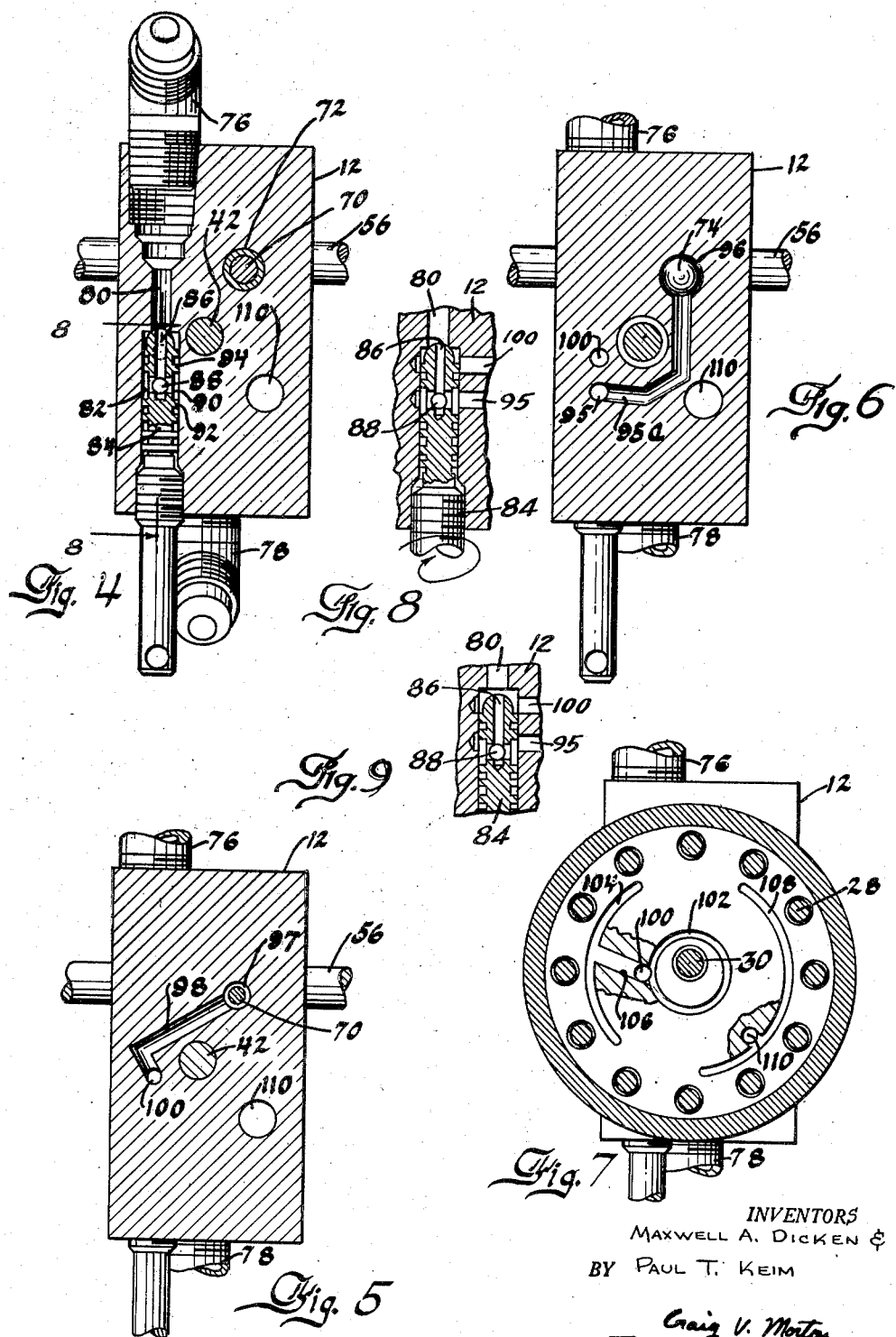

United States Patent Office 2,817,319
Patented Dec. 24, 1957

2,817,319
WINDSHIELD WIPER MOTOR

Maxwell A. Dicken and Paul T. Keim, Vandalia, Ohio, assignors to General Motors Corporation, Detroit, Mich., a corporation of Delaware Application June 27, 1955, Serial No. 518,122

10 Claims. (Cl. 121—87)

This invention pertains to windshield wiper actuating mechanism, and particularly to a fluid pressure actuated wiper motor.

Heretofore, the vast majority of fluid pressure actuated windshield wiper motors have been either of the oscillatable vane type or the reciprocable piston type. In both of these motors, the vane, or piston, is subjected to abrupt movement reversals which are oftentimes undesirable. The present invention relates to a fluid pressure operated wiper motor of the rotary type. Accordingly, among my objects are the provision of a rotary fluid motor for operating a windshield wiper; the further provision of a rotary fluid motor including speed controlling means; and the still further provision of a rotary fluid motor including means operable to automatically interrupt fluid pressure application at a predetermined angular position thereof so as to park the movable motor member.

The aforementioned and other objects are accomplished in the present invention by employing a rotary vane type hydraulic motor in combination with cyclically actuated parking valve means. Specifically, the motor includes a housing having a cylindrical pocket therein, the open end of which is closed by a plate, thereby forming a cylinder. A vane wheel, or rotor, having a plurality of equally spaced, radial slots is eccentrically disposed within the cylindrical pocket. The rotor is attached to a stub shaft, the stub shaft being keyed to a rotatable worm shaft. A plurality of reciprocable vanes are slidably supported in the slots of the rotor.

The rear face of the cylinder pocket is formed with an arcuate pressure inlet port and an arcuate drain port. The inlet port connects with an annular groove having communication with the bottoms of the rotor slots whereby the vanes, or pistons, are urged radially outward into engagement with the periphery of the cylinder. The drain port of the cylinder is connected by an internal passage to a drain port of the housing. The pressure inlet port of the cylinder communicates with a pair of internal housing passages. One passage connects with a cyclically actuated parking valve and a housing pressure inlet port. The other passage is connected through a manual control valve with a pressure inlet port of the housing.

The worm shaft drivingly engages a worm gear that is connected to a rotatable output shaft. The output shaft extends in opposite directions through the motor housing and has a pair of crank arms attached to opposite ends thereof. The crank arms may be connected by links, or other drive means, with a pair of oscillatable wipers in a manner well known in the art. The output shaft has a cam thereon with a single dwell arranged to cooperate with the parking valve through a reciprocable cam follower. At a predetermined angular position of the output shaft during each revolution thereof, and preferably at one end of the wiping stroke, the reciprocable cam follower moves inwardly so as to permit the spring biased parking valve to close, thereby interrupting fluid pressure application to the cylinder inlet port. Accordingly, the wiper motor will be parked at a predetermined angular position automatically upon movement of the manual control valve to the off position.

Further objects and advantages of the present invention will be apparent from the following description, reference being had to the accompanying drawings wherein a preferred embodiment of the present invention is clearly shown.

Figure 2:
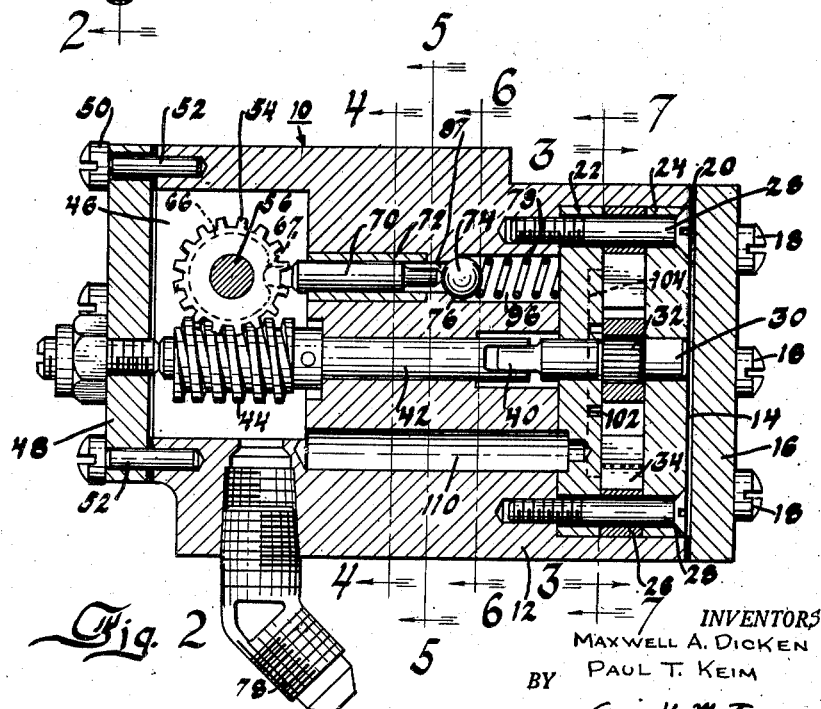
Fig. 2 is a sectional view taken along line 2—2 of Fig. 1.

Figs. 3, 4, 5, 6 and 7 are sectional views taken along lines 3—3, 4—4, 5—5, 6—6 and 7—7, respectively, of Fig. 2.

Figure 8 is a fragmentary sectional view taken along line 8—8 of Figure 4.

Figure 9 is a fragmentary sectional view similar to Figure 8 showing the valve in the open position.

Figure 1:
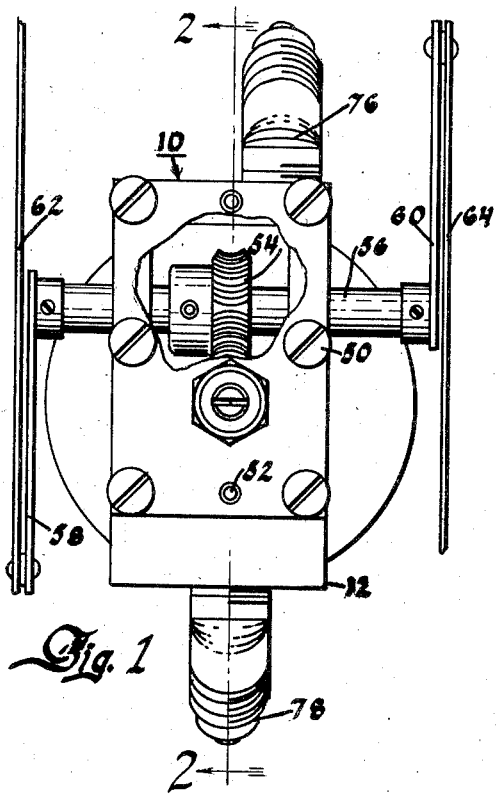
Fig. 1 is a fragmentary view, in elevation, with certain parts broken away, of a wiper motor constructed according to this invention.
Figure 3:
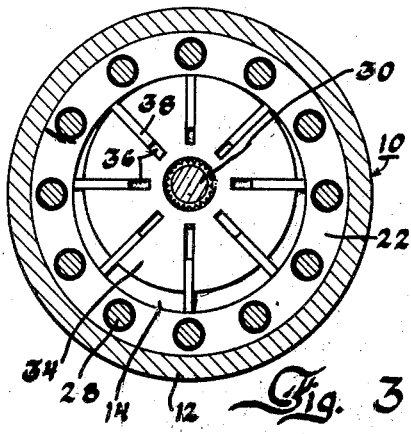

With particular reference to Figs. 1 through 3, the wiper motor is generally indicated by the numeral 10 and comprises a housing 12 having a cylindrical pocket 14 therein. The pocket 14 is closed by an end plate 16, which is connected to the housing by screws 18, a suitable gasket 20 being interposed therebetween. A pair of spaced sealing plates 22 and 24 are disposed within the cylindrical pocket 14, the plates 22 and 24 being maintained in spaced relation by an annular ring 26, and rigidly connected to the housing 12 by a plurality of screws 28.

The plates 22 and 24 are eccentrically apertured and a stub shaft 30 is rotatably supported therein. The stub shaft is formed with an intermediate splined surface 32 to which a rotor, or driving member, 34 is drivingly connected. As seen particularly in Fig. 3, the rotor 34 is eccentrically disposed within the cylindrical pocket 14, and is formed with a plurality of equally spaced, radial slots 36 within which a plurality of reciprocable vanes 38 are slidably supported. The vanes 38 are arranged to engage the inner periphery of the ring 26, and are urged outwardly, as viewed in Fig. 3, in a manner to be described hereinafter.

The stub shaft 30 is keyed at 40 to a shaft 42 having a worm portion 44. The worm 44 is disposed within a housing cavity 46 that is closed by an end plate 48, the end plate being retained by screws 50 and located by dowel pins 52. The worm 44 drivingly engages a worm gear 54, which is connected to a rotary output shaft, or driven member, 56, opposite ends of which are rotatably supported in and extend through the sidewalls of the housing 12. A pair of cranks 58 and 60 are attached to opposite ends of the shaft 56, these cranks being pivotally connected to links 62 and 64, respectively, which links are connected to spaced oscillatable wiper blades, not shown, in a conventional manner.

The worm gear hub is formed with a cam surface 66 having a single dwell 67. The cam surface 66 is engaged by a reciprocable follower, or plunger 70 which is slidably supported by a sleeve 72 within the housing 12. The other end of the cam follower 70 engages a ball 74, which constitutes a parking valve. The ball valve 74 is normally urged towards its seat 76 by a compression spring 79, as clearly shown in Fig. 2. The ball valve 74 is cyclically actuated, that is, once during every revolution of the shaft 56, the cam follower 70 will move to the position depicted in Fig. 2, thereby permitting the spring 79 to seat the ball 74. This occurs at the same predetermined angular position of the shaft 56 during each revolution thereof. At all other angular positions of the shaft 56, the cam surface 66 will move the follower 70 to the right, as viewed in Fig. 2 so as to unseat the ball valve 74.

The instant wiper motor is particularly designed for operation with hydraulic fluid, such as oil. Thus, the housing 12 has inlet port means 76 and drain port means 78. As seen particularly in Fig. 4, the inlet port means 76 communicate with the housing passage 80, which connects with a bore 82 within which a manually operable, reciprocable plunger type throttle valve 84 is disposed. The valve plunger 84 is formed with an axial bore 86 that connects with radial openings 88, the radial openings communicating with an annular channel 90 between lands 92 and 94. When the valve plunger 84 is in the off position, as depicted in Fig. 4, the annular channel 90 communicates with a housing passage 95, as depicted in Figs. 4 and 6. The housing passage 95 connects with housing chamber 96 within which the ball 74 and the spring 79 are disposed. As seen in Fig. 5, the housing bore 97 is connected by a passage 98 with housing passage 100 depicted in Figs. 4 through 7. Housing passage 100 connects at one end with bore 82 and at the other end with annular groove 102 and arcuate groove 104 through a passage 106. Arcuate groove 104 constitutes the pressure inlet port of the motor cylinder whereas annular groove 102 communicates with the inner ends of the slots 36 of the rotor 34. Thus, fluid under pressure is supplied to the inner ends of the slot 36 so as to continuously urge the vanes 38 outwardly into contact with the inner periphery of the annular member 26. Arcuate groove 104, as well as annular groove 102, is formed in the plate 22, arcuate groove 104 thereby communicating with the space between plates 22 and 24 so as to effect counterclockwise rotation of the rotor 34, as viewed in Fig. 3.

Drain fluid from the cylinder flows into arcuate groove 108 of the plate 22 which connects with a housing passage 110. Housing passage 110 communicates with the chamber 46, thereby lubricating the moving parts disposed therein, chamber 46 also communicating with the drain port means 78.

*Operation*

When the manual control valve plunger 84 is moved downwardly in the position of Figure 9, as viewed in Fig. 4, fluid under pressure flowing into passage 80 from the inlet port means 76, will flow through both passages 100 and 95, and will, thus, be supplied continuously to annular groove 102 and arcuate groove 104. The cyclic actuation of the parking valve 74 by the cam 66 and the follower 70 will not interrupt application of pressure fluid to the motor cylinder since the passage 100 is connected directly to the source of supply. The speed of motor operation can be controlled by positioning the valve plunger 84 so as to throttle the flow of pressure fluid from the passage 80 to the bore 82. When it is desired to interrupt operation of the motor, the valve plunger 84 is positioned, as depicted in Fig. 4, whereby fluid under pressure is supplied to the motor cylinder through axial bore 86, ports 88, passage 95, through the parking valve 74 and the passages 98 and 100. Pressure fluid will continue to be supplied until the shaft 56 reaches a predetermined angular position, wherein the follower 70 engages the cam dwell 67 whereupon the spring 78 will move the ball valve 74 into engagement with its seat 76, thereby interrupting the application of pressure fluid to the motor cylinder and parking the wiper motor and the wiper blades drivingly connected therewith at one end of their normal stroke.

While the embodiment of the present invention as herein disclosed, constitutes a preferred form, it is to be understood that other forms might be adopted.

What is claimed is as follows:

1. Windshield wiper actuating mechanism including, a fluid motor having a rotary driving member, means to supply fluid under pressure to said driving member to impart rotation thereto, a rotatable driven member operatively connected to said driving member, and means actuated by one of said members and operable to interrupt the supply of fluid under pressure to said driving member at a predetermined angular position of said driven member so as to park the said driven member.

2. A windshield wiper motor including, a cylinder, a rotor disposed in said cylinder capable of continuous rotation by application of fluid pressure to said cylinder, a manual control valve for throttling the flow of pressure fluid to said cylinder so as to control the speed of rotation of said rotor, a driven member operatively connected to said rotor and rotatable thereby, a parking valve connected in parallel with said manual control valve, and means for actuating said parking valve during each revolution of said driven member so as to interrupt the application of pressure fluid to said cylinder and park said driven member at a predetermined angular position when said manual control valve is moved to an off position.

3. A windshield wiper motor including, a cylinder, a rotor disposed in said cylinder capable of continuous rotation upon application of pressure fluid to said cylinder, a manual control valve for controlling the application of pressure fluid to said cylinder, a rotatable driven member operatively connected to said rotor, a parking valve connected in parallel with said manual control valve, and cam means connected to said driven member for cyclically actuating said parking valve during each revolution of said driven member.

4. A windshield wiper motor including, a cylinder, a rotor disposed in said cylinder capable of continuous rotation upon the application of pressure fluid to said cylinder, a manual control valve for controlling the application of pressure fluid to said cylinder, a rotatable driven member operatively connected to said rotor, a spring biased parking valve connected in parallel with said manual control valve, and means rotatable with said driven member for cyclically actuating said parking valve so as to interrupt the application of pressure fluid to said cylinder and park said driven member at a predetermined angular position when the manual control valve is moved to the off position.

5. A windshield wiper motor including, a cylinder, a rotor disposed in said cylinder capable of continuous rotation upon the application of pressure fluid to said cylinder, a manual control valve for controlling the application of pressure fluid to said cylinder, a rotatable driven member operatively connected to said rotor, a parking valve member connected in parallel with said manual control valve, a spring constantly acting upon said parking valve for urging it to a closed position, a reciprocable plunger engageable with said valve for opposing the action of said spring, and means rotatable with said driven member for cyclically actuating said plunger so as to interrupt application of pressure fluid to said cylinder and park said driven member in a predetermined angular position when said manual control valve is moved to an off position.

6. The wiper motor set forth in claim 5 wherein said rotor and said driven member are interconnected by gearing, and wherein said last recited means comprises a cam.

7. The combination set forth in claim 6 wherein said gearing is disposed in a chamber through which drain fluid from said cylinder flows so as to lubricate the said gearing.

8. The motor set forth in claim 4 wherein said rotor is eccentrically disposed within said cylinder and includes a plurality of circumferentially spaced, radial slots, and wherein a plurality of reciprocable vanes are disposed in said radial slots.

9. The motor set forth in claim 8 wherein said reciprocable vanes are urged radially outward by fluid under pressure.

10. Windshield wiper actuating mechanism including, a fluid motor having a rotary driving member, means to supply fluid under pressure to said driving member to impart rotation thereto, a rotatable driven member operatively connected to said driving member, and cyclically operated parking means actuated by said driven member and operable to interrupt the supply of pressure fluid to said driving member at a predetermined angular position of said driven member.

No references cited.